Patented June 15, 1943

2,321,928

UNITED STATES PATENT OFFICE 2,321,928

RECOVERY OF TOCOPHEROL (VITAMIN E) AND VALUABLE BY-PRODUCTS FROM VEGETABLE OILS

William Douglas McFarlane, Ste. Anne de Bellevue, Quebec, and William Ernest Parker, Montreal, Quebec, Canada, assignors to Ogilvie Flour Mills Company Limited, Montreal, Quebec, Canada, a Dominion company No Drawing. Application May 8, 1941, Serial No. 392,586. In Canada January 7, 1941

5 Claims. (Cl. 260—333)

This invention relates to improvements in the treatment of saponifiable oils and it is especially concerned with the recovery therefrom of tocopherol (vitamin E) in relatively concentrated form. Prior methods of concentrating tocopherol from wheat germ and similar oils have all included alkaline saponification. This is objectionable because tocopherol is known to be unstable in alkaline solutions while a further difficulty encountered arises from the presence of sterols and carotinoid pigments which are difficult to remove without loss of tocopherol.

According to the present invention the improved method of recovering tocopherol vitamin E from vegetable oils comprises treating them dissolved in an organic solvent with cold concentrated sulphuric acid, and then separating the organic solvent-phase and evaporating the solvent. This leaves a clear, colorless oil, free from sterols and which contains from 5 to 10 times the tocopherol content of the original oil.

It is advisable to wash the separated solvent-phase before evaporating the solvent with dilute alkali in order to remove the traces of sulphuric acid and sulphonated compounds which may be present. The preferred solvent to use is petroleum ether, although other inert solvents which do not readily react with sulphuric acid, such as acetone, may likewise be employed. The concentration of the sulphuric acid should be from 85 to 88%.

The separated acid phase may be diluted with water and the resulting white precipitate filtered and washed free of acid. The residue so secured has the properties of a detergent and it can be extracted with ethyl ether to yield an oil having antioxidant properties.

The sulphuric acid treatment removes up to 90% of the oil and it is especially applicable to wheat germ oil. The tocopherol-containing extract is free from sterols and carotinoid pigments and it does not respond to the Liebermann-Bourchard reaction for sterols nor the Carr-Price reaction for carotinoid pigments.

*Example*

40 grams of wheat germ oil are dissolved in 1 liter of petroleum ether and 200 cc. of 85% sulphuric acid are added slowly and in a fine stream under constant agitation. The agitation is continued for 5 minutes after the addition of the sulphuric acid has been completed and a reddish-brown mass settles to the bottom of the container. The clear supernatent petroleum ether phase is then decanted and transferred to a distilling apparatus from which the petroleum ether is removed by distillation. The resulting product is a clear, colorless oil which gives no tests for sterols nor for carotinoid pigments but which gives the tests for tocopherol.

The acid phase is treated with a large excess of water, whereupon the red-brown color disappears and the sludge is flocculated as a white precipitate. It is removed by filtration and washed free of excess acid to yield an effective detergent. Upon extraction with ethyl ether an oil is recovered which readily emulsifies with water, which on standing develops an odor of linolool and possesses strong antioxidant properties.

What we claim is:

1. An improved method of recovering tocopherol (vitamin E) from vegetable oils which comprises treating a solution of a vegetable oil in an organic solvent with cold concentrated sulphuric acid, separating the organic solvent-phase and then evaporating the solvent to leave an oil which is rich in tocopherol content.

2. An improved method according to claim 1 in which the separated solvent phase is washed with dilute alkali before the solvent is evaporated.

3. An improved method of recovering tocopherol (vitamin E) from vegetable oils, which comprises treating them dissolved in petroleum ether with cold concentrated sulphuric acid, separating the organic solvent phase and then evaporating the solvent to leave an oil which is rich in tocopherol content.

4. An improved method according to claim 1 in which 85%–88% sulphuric acid is used.

5. An improved method according to claim 1 in which the separated acid phase is diluted with water and the resulting white precipitate filtered and washed free of acid.

WILLIAM DOUGLAS McFARLANE.
WILLIAM ERNEST PARKER.